United States Patent
Kimura et al.

(10) Patent No.: US 12,524,869 B2
(45) Date of Patent: Jan. 13, 2026

(54) SYSTEM AND METHOD FOR VERIFICATION AND VALIDATION OF INTEGRATED CIRCUIT

(71) Applicant: Battelle Memorial Institute, Columbus, OH (US)

(72) Inventors: Adam Kimura, Lewis Center, OH (US); Vince A. McKinsey, Hilliard, OH (US); Adam R. Waite, Centerville, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 561 days.

(21) Appl. No.: 17/988,850

(22) Filed: Nov. 17, 2022

(65) Prior Publication Data
US 2024/0169512 A1 May 23, 2024

Related U.S. Application Data

(60) Provisional application No. 63/280,817, filed on Nov. 18, 2021.

(51) Int. Cl.
*G06T 7/00* (2017.01)

(52) U.S. Cl.
CPC .......... *G06T 7/001* (2013.01); *G06T 2200/24* (2013.01); *G06T 2207/10061* (2013.01); *G06T 2207/30148* (2013.01)

(58) Field of Classification Search
CPC .............. G06T 7/001; G06T 2200/24; G06T 2207/10061; G06T 2207/30148
See application file for complete search history.

(56) References Cited

U.S. PATENT DOCUMENTS

| | | | |
|---|---|---|---|
| 5,086,477 A | * | 2/1992 | Yu .......................... G06F 30/39 382/243 |
| 5,581,738 A | | 12/1996 | Dombrowski |
| 5,694,481 A | * | 12/1997 | Lam ..................... G06F 30/398 382/294 |
| 5,819,064 A | | 10/1998 | Razdan |
| 5,867,395 A | | 2/1999 | Watkins et al. |

(Continued)

OTHER PUBLICATIONS

Abiad, A. et al., "Printed circuit boards isomorphism: An experimental study". Computers & Industrial Engineering. Oct. 1, 2020; 148: 106715.*

(Continued)

*Primary Examiner* — Samir A Ahmed
(74) *Attorney, Agent, or Firm* — Lippes Mathias LLP

(57) ABSTRACT

In an integrated circuit (IC) analysis, a reference IC layout is stored. Instructions are readable and executable by an electronic processor to perform an IC analysis method, including: receiving layer images of a physical IC; extracting polygons depicted in the layer images; detecting errors in the physical IC by applying homeomorphic error detection to compare the extracted polygons with polygons of the reference IC layout; and displaying the detected errors on the display. The detecting of errors may include detecting an error comprising a topological inequivalence between an extracted polygon or pair of polygons and a polygon or pair of polygons of the reference IC layout. The detecting of errors may include detecting an error comprising a topological coverage error.

20 Claims, 6 Drawing Sheets

(56) References Cited

U.S. PATENT DOCUMENTS

| | | | |
|---|---|---|---|
| 6,173,435 | B1 | 1/2001 | Dupenloup |
| 6,289,116 | B1* | 9/2001 | Chamberlain ........ G06F 30/398 |
| | | | 382/140 |
| 6,697,982 | B2 | 2/2004 | Chakravarthy |
| 7,000,213 | B2 | 2/2006 | Banerjee |
| 7,337,100 | B1 | 2/2008 | Hutton |
| 7,362,135 | B1 | 4/2008 | Chang |
| 7,653,884 | B2 | 1/2010 | Furnish |
| 7,784,005 | B1 | 8/2010 | Ng |
| 7,917,877 | B2 | 3/2011 | Singh |
| 7,937,678 | B2 | 5/2011 | Lippmann |
| 8,037,443 | B1 | 10/2011 | Krishnaswamy |
| 8,156,457 | B2 | 4/2012 | Basile |
| 8,156,458 | B2 | 4/2012 | Baker |
| 8,327,311 | B1 | 12/2012 | Neema |
| 8,347,243 | B2 | 1/2013 | Bruneel |
| 8,484,590 | B2 | 7/2013 | Newcomb |
| 8,612,772 | B1 | 12/2013 | Langhammer |
| 8,661,394 | B1 | 2/2014 | Frederick |
| 8,881,074 | B2 | 11/2014 | Faes |
| 9,047,429 | B2 | 6/2015 | He |
| 9,342,435 | B2 | 5/2016 | Van Rozen |
| 9,355,000 | B1 | 5/2016 | Biswas |
| 9,367,659 | B2 | 6/2016 | Saghizadeh |
| 9,430,606 | B2 | 8/2016 | Oberai |
| 11,010,519 | B2 | 5/2021 | Kimura |
| 11,062,067 | B2 | 7/2021 | Hills |
| 2007/0256037 | A1* | 11/2007 | Zavadsky ............... G06F 30/30 |
| | | | 716/103 |
| 2008/0295043 | A1 | 11/2008 | Chang et al. |
| 2009/0031277 | A1 | 1/2009 | McElvain et al. |
| 2009/0313596 | A1 | 12/2009 | Lippmann et al. |
| 2010/0306721 | A1* | 12/2010 | Anpo ................. H01J 37/3174 |
| | | | 716/106 |
| 2011/0002528 | A1* | 1/2011 | Bajura .................... G06T 7/001 |
| | | | 382/145 |
| 2011/0113392 | A1 | 5/2011 | Chakraborty et al. |
| 2015/0100928 | A1* | 4/2015 | Saghizadeh ............. G06F 30/31 |
| | | | 716/102 |
| 2015/0100929 | A1 | 4/2015 | Redekopp et al. |
| 2015/0242544 | A1 | 8/2015 | Berkovitz et al. |
| 2017/0323439 | A1* | 11/2017 | Sandberg ................ G06F 18/22 |
| 2023/0298159 | A1* | 9/2023 | Waite ....................... G06T 1/20 |
| | | | 348/79 |

OTHER PUBLICATIONS

Bernhard Lippmann, et al, "Verification of physical designs using an integrated reverse engineering flow for nanoscale technologies" Integration, the VLSI Journal vol. 17 Nov. 29, 2020.

Raul Quijada, et al, "Large-Area Automated Layout Extraction Methodology for Full-IC Reverse Engineering" Journal of Hardware and Systems Security Oct. 31, 2018.

Benz, et al., "BIL: A tool-chain for bitstream reverse-engineering", Integrated Circuits and Systems Lab, Technische Universitat Darmstadt, Germany, 2012, pp. 735-738.

Ding, et al., "Deriving an NCD file from an FPGA bitstream: Methodology, architecture and evaluation", Microprocessors and Microsystems, May 2013, DOI:10.1016/j.micpro.2012.12.003, vol. 37, pp. 299-312.

Note et al., "From the bitstream to the netlist", FPGA '08: Proceedings of the 16th international ACM/SIGDA symposium on Field programmable gate arrays, Feb. 2008.

Yu, et al., "Recent Advances in FPGA Reverse Engineering", Electronics, 2018, 7, 246, doi:10.3390/electronics7100246, www/mdpi.com/journal/electronics.

Zhang Tao et al: "A Comprehensive FPGA Reverse Engineering Tool Chain: From Bitstream to RTL Code", IEEE Access, vol. 7, Feb. 27, 2019 (Feb. 27, 2019), pp. 38379-38389, XP011717579, DOI: 10.1109/ACCESS.2019.2901949 [retrieved on Apr. 1, 2019] abstract p. 38382-p. 38384.

Wenchao Li: "Formal Methods for Reverse Engineering Gate-Level Netlists", Dec. 18, 2013 (Dec. 18, 2013), XP055379711, Retrieved from the Internet: URL:https://www2.eecs.berkeley.edu/Pubs/TechRpts/2013/EECS-2013-222.pdf [retrieved on Sep. 24, 2020] p. 13.

\* cited by examiner

Topological Equivalence

Definition: A Geometry, $G$, is defined as follows:
$$G := \{p : p \text{ is a polygon}\}$$

Definition: $touchees(p) := \{x : x \cap p \neq \emptyset\}$
where $x$ and $p$ are polygons Definition: Polygon $A$ and Polygon $B$ are touching polygons iff
$$A \cap B \neq \emptyset$$

Definition:
Polygon $A$ is topologically equivalent to Polygon $B$, denoted $A \equiv B$, iff
$$touchees(A) = \{B\} \text{ and } touchees(B) = \{A\}$$

Definition:
Geometry $X$ is topologically equivalent to Geometry $Y$, denoted $X \equiv Y$, iff
$$\forall x \in X, \exists y \in Y : x \equiv y$$

{ 50

Topological Coverage

Definition: Given a 3-tuple of Geometries, $(G, E, V)$, and that $G \equiv E$,
$E$ topologically covers $V$ iff
$$\forall a \in V : touchees(v) \supseteq G*, \text{ where } G* \subseteq G;$$
$$\exists e \in E : e \in touchees(v)$$

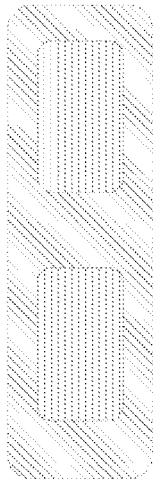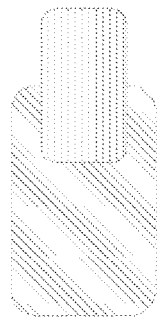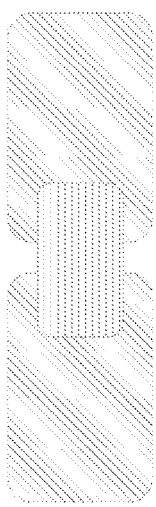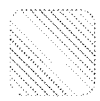
Fig. 5

SYSTEM AND METHOD FOR VERIFICATION AND VALIDATION OF INTEGRATED CIRCUIT

CROSS REFERENCE TO RELATED APPLICATIONS

This application claims the benefit of U.S. Provisional Application No. 63/280,817 filed Nov. 18, 2021 and titled "SYSTEM AND METHOD FOR VERIFICATION AND VALIDATION OF INTEGRATED CIRCUIT", which is incorporated herein by reference in its entirety.

STATEMENT REGARDING FEDERALLY SPONSORED RESEARCH OR DEVELOPMENT

This invention was made with government support under contract number FA8650-15-D-1953 awarded by Air Force Research Laboratory (AFRL). The government has certain rights in the invention.

BACKGROUND

The following relates to the semiconductor integrated circuit (IC) validation arts, outsourced IC integrity verification arts, and to the like.

The manufacture of ICs is a complex process. For example, a modern IC is manufactured in a front end-of-line (FEOL) process in which field-effect transistors (FETs), diodes, and/or other circuit components are formed in the substrate of the silicon or silicon-on-insulator (SOI) wafer by a sequence of processes such as selective deposition, etching, ion implantation, oxidation, et cetera. In a back end-of-line (BEOL) process, these circuit components are electrically interconnected by formation of a complex layout of electrical traces distributed over multiple metallization layers and electrical vias connecting between the metallization layers and between the metallization layers and the underlying circuit components formed in the FEOL processing.

Design of the layout of an IC is usually performed using IC design software, and is within the capability of many technologically savvy companies, national militaries and governmental entities. On the other hand, the actual manufacture of the IC is sometimes beyond the capabilities of such parties. In such circumstances, the manufacture of the designed IC may be outsourced to a semiconductor foundry. To do so, the IC is typically designed by the outsourcing party and stored as a reference IC layout in an industry-standard format such as Graphic Design System II (GDSII) or Open Artwork System Interchange Standard (OASIS). The reference IC layout is delivered (i.e. outsourced) to the foundry which performs the actual fabrication of the ICs in accordance with the reference IC layout provided by the outsourcing party. Depending on the arrangement between the outsourcing party and the semiconductor foundry, the ICs may be delivered in wafer form (that is, without dicing individual dies), or as diced IC chips, or as fully packaged ICs.

For various reasons, the outsourcing party may want to compare the physical layout of the circuitry of the delivered ICs with the reference IC layout. For example, if the IC is to be deployed in a mission-critical task such as an aircraft or a military weapons system or a commercial product that is to be sold at high volume, then the outsourcing party may want to perform quality control checks on samples drawn from delivered batches received from the foundry to ensure the ICs have been fabricated in accordance with the reference IC layout. Once features of the physical IC have been matched to features in the reference IC layout, further analysis such as materials analysis may be performed to ensure the foundry used appropriate materials and processes in the manufacturing. If there is a potential trust concern with the foundry (e.g., if it is based in a foreign country or is controlled by a commercial competitor), then the outsourcing party may want to check one or a few of the ICs received from the foundry to ensure they have not been modified to include potentially malicious add-on circuitry. As yet another example, if the foundry has been providing the IC for a number of years but has now gone out of business, become overpriced, or for some other reason is no longer supplying the IC, then the outsourcing party may want to verify a few of the last batches received from the (former) supplier foundry against the reference IC layout before sending the reference IC layout to a new foundry for continued manufacture of the IC.

To compare the physical IC with the reference IC layout, the IC is removed from its package (if it was delivered in packaged form), delayered and each layer imaged using optical microscopy or scanning electron microscopy (SEM). Image features corresponding to metal traces, vias, and/or circuit components in the layer images are then compared with corresponding layers of the reference IC layout.

BRIEF SUMMARY

In accordance with some illustrative embodiments disclosed herein, an integrated circuit (IC) analysis system is disclosed, comprising an electronic processor, a display operatively connected with the electronic processor, and a non-transitory storage medium storing a reference IC layout and instructions readable and executable by the electronic processor to perform an IC analysis method. That method includes: receiving layer images of a physical IC; extracting polygons depicted in the layer images; detecting errors in the physical IC by applying homeomorphic error detection to compare the extracted polygons with polygons of the reference IC layout; and displaying the detected errors on the display.

In accordance with some illustrative embodiments disclosed herein, a non-transitory storage medium stores a reference IC layout and instructions readable and executable by a computer to perform an IC analysis method. That method comprises: receiving layer images of a physical IC; extracting polygons depicted in the layer images; detecting errors in the physical IC including detecting an error comprising a topological inequivalence between an extracted polygon or set of polygons from the physical IC layout and a polygon or set of polygons from the reference IC layout; and outputting the detected errors on a display of, or operatively connected with, the computer.

In accordance with some illustrative embodiments disclosed herein, a method of IC analysis comprises: receiving layer images of a physical IC at a computer; using the computer, extracting polygons depicted in the layer images and detecting errors in the physical IC by applying homeomorphic error detection to compare the extracted polygons with polygons of a reference IC layout; and displaying the detected errors on a display of or operatively connected with the computer.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

FIG. 4 presents parameters and definitions for topological equivalence and topological coverage aspects of the homeomorphic error detection employed in the process of FIG. 1.

FIG. 5 diagrammatically illustrates six possible cases for topological equivalence suitably employed in the topological equivalence analysis employed in the process of FIG. 1.

DETAILED DESCRIPTION

While straightforward in principle, the process of comparing layer images acquired for an IC with the corresponding reference IC layout can be challenging in practice. Notably, a modern IC may include tens of thousands, hundreds of thousands, or more circuit components (FETs, diodes, et cetera) interconnected by electrical traces distributed over multiple layers of metallization with electrical vias connecting various points in the metallization layers and the underlying circuit components. Visually comparing such complex layouts may not be feasible. Artificial intelligence (AI) such as artificial neural networks (ANNs), convolutional neural networks (CNNs) or the like can potentially be leveraged to automate the comparison of the layer images with the reference IC layout. However, the layer images may include image defects that make such comparisons difficult and can lead to errors in the AI output. Furthermore, since even a single error in the physical IC can be unacceptable, the comparison should ideally be 100% accurate, a success rate that is difficult or impossible to achieve by manual or AI comparison of layer images and the reference IC layout.

Disclosed herein is an approach for comparing the layer images and the reference IC layout that employs homeomorphic error detection. Illustrative embodiments identify instances of lack of topological equivalence or topological coverage. The disclosed approaches employing homeomorphic error detection are fast and do not rely on empirical training (unlike the case for AI). The homeomorphic error detection approach is analytical rather than employing empirical techniques, and so it is straightforward to determine the reason for any errors in the homeomorphic error detection. Still further, since image artifacts such as blurring, particulates, and so forth tend to overextend image features corresponding to metal traces, vias, circuit components, and so forth, the homeomorphic error detection is typically overinclusive, that is, it is much more likely to flag a supposed difference where none exists, and is much less likely to miss a difference that is actually present.

Figure 1:
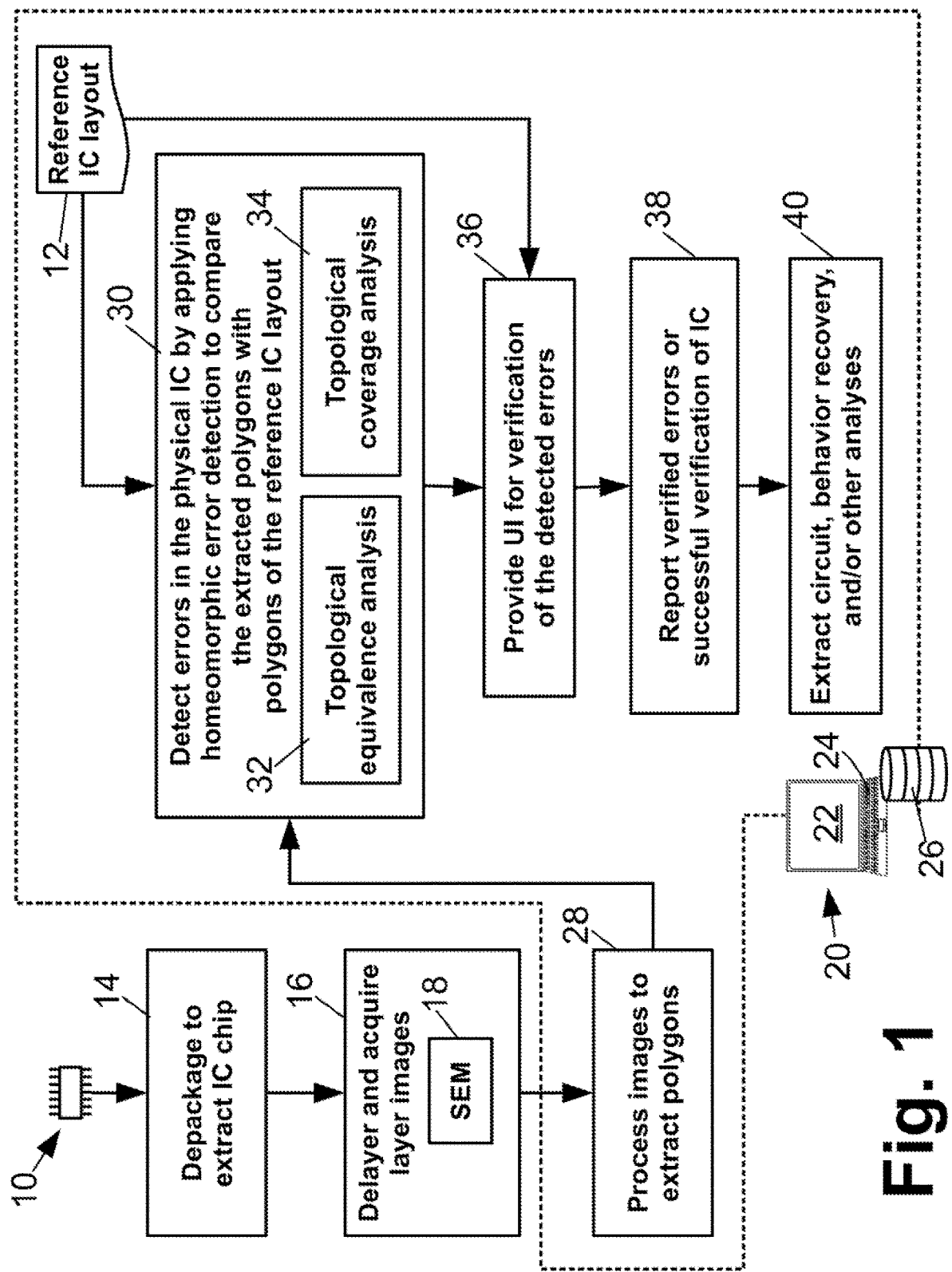
FIG. 1 diagrammatically shows an illustrative process for comparing a physical IC with a reference IC layout.

With reference to FIG. 1, an illustrative process for comparing a physical IC 10 with a reference IC layout 12 is described. By the term "physical IC" an actually fabricated IC is meant, for example physically fabricated on a silicon wafer, or on a silicon-on-insulator (SOI) wafer, or another substrate, and including actually fabricated circuit components such as field-effect transistors (FETs), diodes, and so forth produced in FEOL processing, which are electrically interconnected by electrically conductive traces formed during BEOL processing, which are typically arranged as multiple patterned metal layers with vias running between layers and between layers and circuit components. In an operation 14, the IC 10 is depackaged to extract the IC chip, which is mounted for imaging by a scanning electron microscope (SEM), optical microscope, or the like. (If the IC is a bare chip without packaging, then the depackaging is omitted). In an operation 16, the IC is systematically delayered and layer images are acquired. For example, when processing the BEOL processing product, the delayering preferentially removes intermetal dielectric (IMD) to expose a patterned metal layer comprising conductive traces, image the patterned metal layer to produce a layer image of that metal layer, followed by etching to remove the metal of the metal layer and subsequent imaging to produce a layer image of the vias underlying the just-removed metal layer, and so forth to provide layer images of the metal layers and the vias between the layer images. The illustrative example employs a scanning electron microscope 18 to acquire the layer images, for example using a backscattered electron detector and/or a secondary electron detector. However, other types of imaging devices may be employed, such as an optical microscope.

Figure 2:
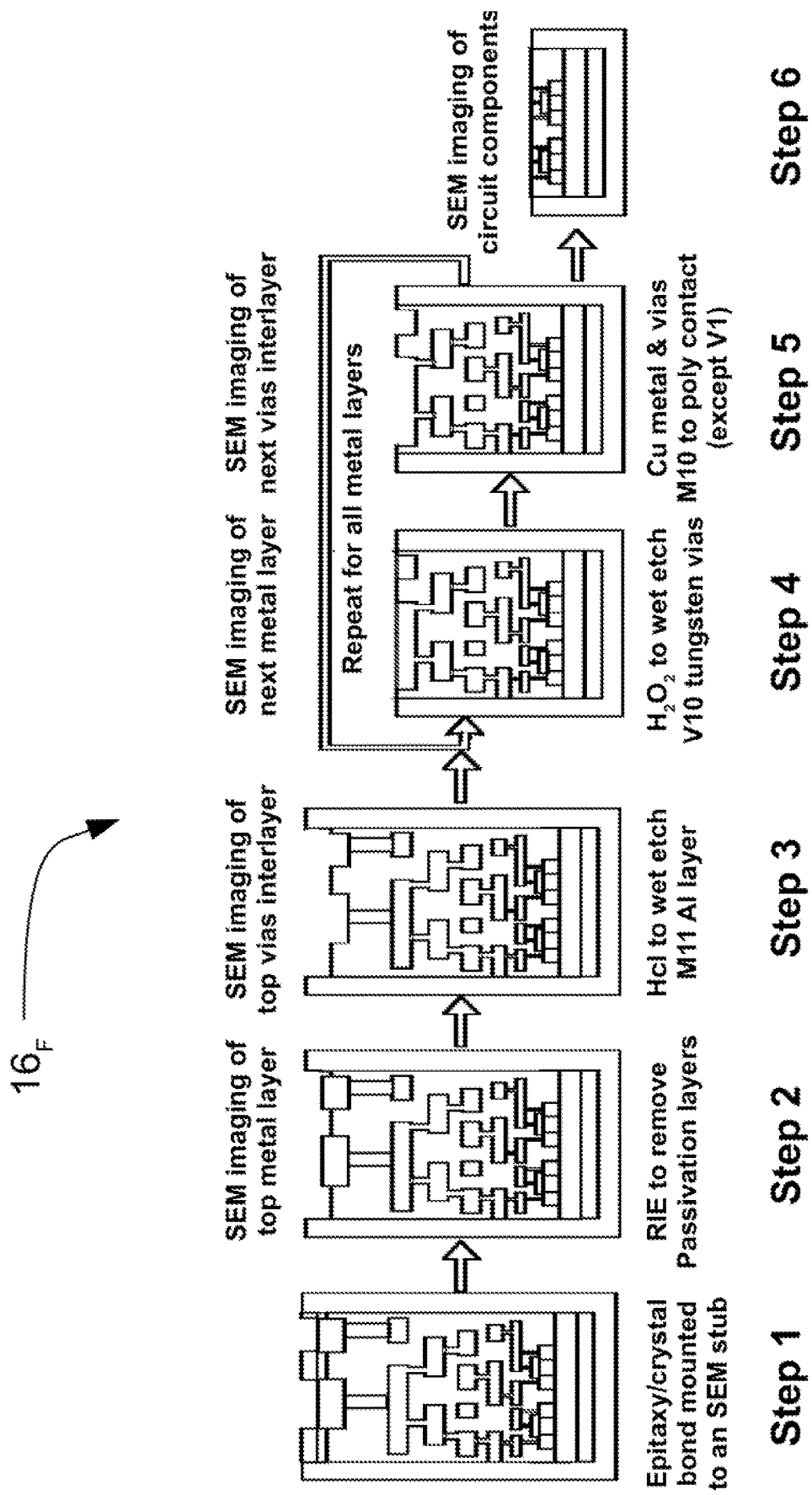
FIG. 2 diagrammatically shows one nonlimiting illustrative frontside delayering process.

With continuing reference to FIG. 1 and with brief reference to FIG. 2, an illustrative example of operation $16_F$ in the case of frontside delayering is diagrammatically shown. In step 1, the IC (after depackaging) is epoxy/crystal bond mounted to an SEM stub. In step 2, reactive ion etching (RIE) is performed to remove the passivation layers to expose the topmost metallization layer, which is then imaged to acquire a layer image for the topmost metallization layer. In step 3, the topmost metallization layer is removed by hydrochloric acid (HCl) wet etching. HCL is a suitable etchant for aluminum metallization; other suitable etchants may be used if the metallization comprises another type of metal. This exposes the vias that had connected with the topmost metallization layer, and a layer image is acquired of those uppermost vias. In step 4, hydrogen peroxide ($H_2O_2$) is used to wet etch tungsten vias to expose the next metal layer. In Steps 4 and 5, copper (Cu) metal and via layers are etched, and imaged, and the steps 4 and 5 repeat for each subsequent metal layer through to the polysilicon (poly) contact layer, with layer images being acquired after each delayering step. For example, metal lines may be etched (or polished away) by chemical mechanical polishing (CMP) with suitable polishing/lapping pads and media, and vias can be etched by a $FeCl_3$ wet etch. In an optional final step 6, after the BEOL processing product has been removed in steps 1-5, the underlying circuit components of the FEOL processing product can be imaged. Optionally, the FEOL processing product can be similarly delayered and layer images acquired, using etches that remove specific oxide, metal, or other layers or features of the FETs, diodes, or other circuit components.

Figure 3:
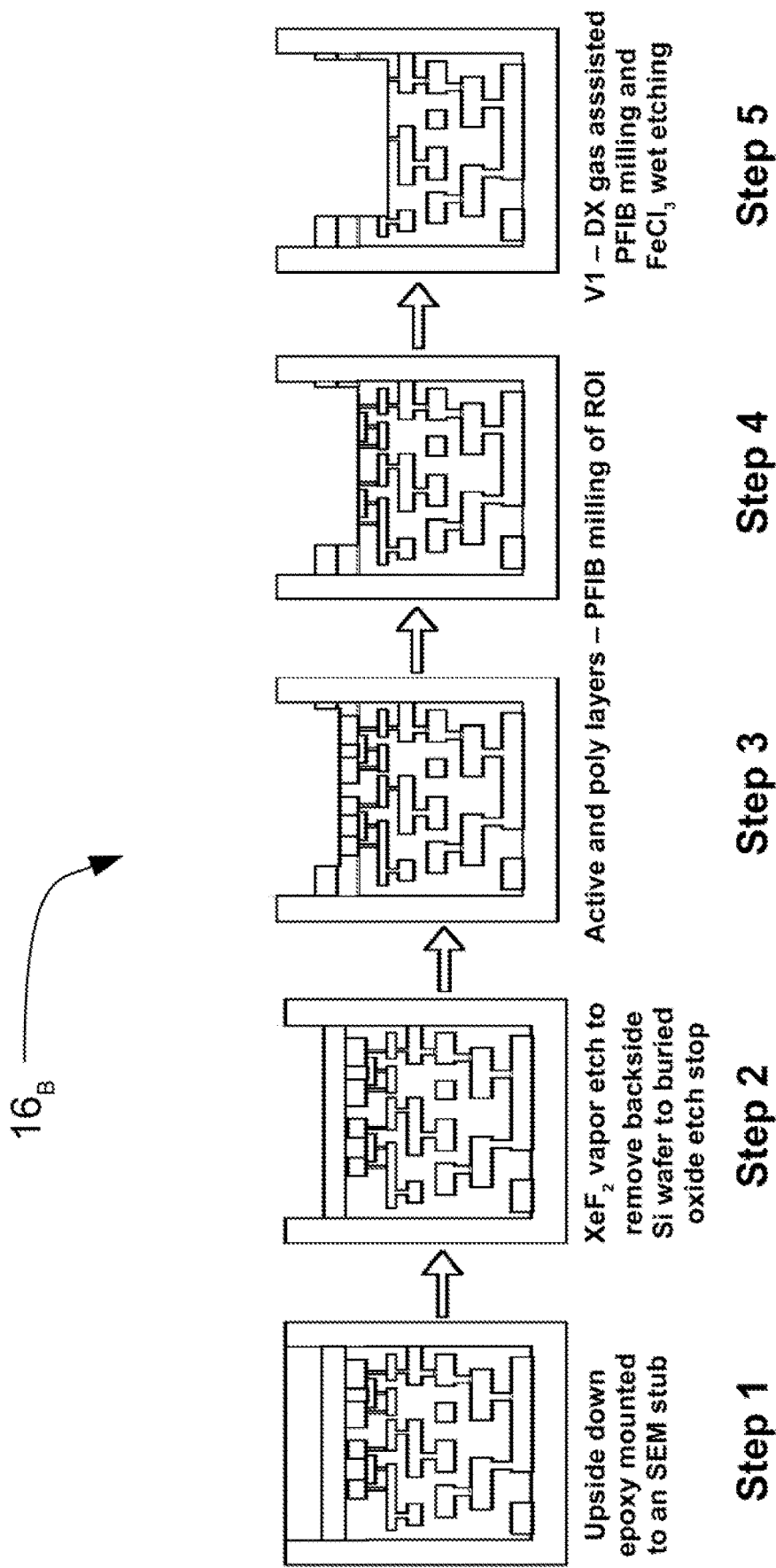
FIG. 3 diagrammatically shows one nonlimiting illustrative backside delayering process.

With continuing reference to FIG. 1 and with brief reference to FIG. 3, an illustrative example of operation 16B in the case of backside delayering is diagrammatically shown. In step 1, the IC is upside-down epoxy mounted to a SEM stub. In step 2, $XeF_2$ vapor etch is used to remove the backside Si wafer to the buried oxide etch stop. In steps 3 and 4, active and polysilicon layers are etched by plasma focused ion beam (PFIB) milling. In step 5, the vias contacting the circuit components are suitably removed by DX gas assisted PFIB milling and FeCl3 wet etching. Thereafter, the processing for delayering the BEOL processing product as described with reference to FIG. 2 may be applied, in reverse order.

More generally, it will be appreciated that the specific delayering operation sequence, etchants, CMP chemistry, and/or other delayering processes can be tailored to the layers sequence and the type of materials used in the BEOL and/or FEOL processing product. The imaging similarly can employ a suitable imaging modality for the type of physical layer being imaged. For example, metallization layers are often most clearly imaged by SEM using backscatter electron (BSE) imaging, while vias of tungsten or a similar material are often most clearly imaged by SEM using secondary electron (SE) imaging. In some cases, optical microscopy imaging may be suitable, for example for imaging some FEOL processing product layers.

The layer images then serve as input to an electronic processor 20, such as an illustrative computer, which compares the layer images with the reference IC layout 12 as described herein. The electronic processor 20 may be a local computer such as a desktop or notebook computer as illustrated, or may be a server computer, a cloud-based computing resource, a dedicated microprocessor-based image processing device, various combinations thereof, and/or so forth. In the illustrative embodiment, the electronic processor 20 includes or is operatively connected with a display 22 or other output device (e.g. a display or multiple displays, and/or a printer, et cetera) and at least one user input (e.g., an illustrative keyboard 24, and/or a mouse or other pointing device, et cetera). The electronic processor 20 is suitably programmed by instructions stored on a (diagrammatically indicated) non-transitory storage medium 26 to perform various processing operations 28, 30, 36, 38, 40 as described herein. The reference IC layout 12 is also suitably stored on the non-transitory storage medium 26. The non-transitory storage medium 26 may comprise, by way of nonlimiting illustration: a hard disk drive or other magnetic storage medium; a flash memory, CMOS memory, or other electronic storage medium; an optical disk or other optical storage medium; various combinations thereof, or so forth.

More particularly, in an operation 28 the layer images output by the operation 16 are processed by the electronic processor 20 to extract polygons representing image features captured in the layer images. In one suitable approach, polygon extraction is performed through a mixture of pixel transforms, thresholding filters, smoothness filters, morphological operations (e.g., 2-12 operations in some nonlimiting illustrative embodiments). Some subregions may employ more than one iteration to extract a high percentage of features.

In an operation 30, errors in the physical IC 10 are detected by applying homeomorphic error detection to compare the extracted polygons with polygons of the reference IC layout 12. As further detailed herein, the homeomorphic error detection may employ topological equivalence analysis 32 to detect an error comprising a topological inequivalence between an extracted polygon or set of polygons from the physical IC layout 10 and a polygon or set of polygons from the reference IC layout 12. In some embodiments, the homeomorphic error detection may also employ topological coverage analysis 34 to detect an error comprising a topological coverage error of an extracted polygon respective to an extracted polygon representing a conductive trace and a polygon of the reference IC layout 12 representing a conductive trace. In some embodiments, the topological coverage analysis 34 is an addition to, rather than a replacement of, the topological equivalence analysis 32.

An advantage of homeomorphic error detection is that it tends to be overinclusive. Hence, some of the errors detected in the operation 30 may not actually be due to errors in the fabrication of the physical IC 10. For example, an image artifact may produce an inaccuracy in the boundary of an extracted polygon which may be detected as a topological inequivalence with respect to the reference IC layout 12, although it does not actually correspond to a manufacturing error in the physical IC 10. On the other hand, it is unlikely that the homeomorphic error detection will fail to detect an actual manufacturing error.

In view of this, in an optional operation 36 a user interface (UI) may be provided, by which a user can review the detected errors and accept or reject each detected error. For example, the UI may display a fused image depicting an enlarged view of the portion of the layer image where the error was detected with the corresponding portion of the reference IC layout 12 overlaid (or vice versa, e.g. the portion of the layer image containing the detected error may be overlaid on the corresponding portion of the reference IC layout 12). Color coding or other types of highlighting can be used to distinguish the displayed layer image and reference IC image, and further visual highlighting can flag the detected error in the fused image. Other presentation approaches can be employed, such as displaying the portion of the layer image where the error was detected and the corresponding portion of the reference IC layout 12 as separate side-by-side or upper-lower images.

Advantageously, the automated error detection 30 produces a relatively small list of errors which can be easily reviewed in the operation 36 by a human reviewer using the UI. By contrast, omission of the automated error detection operation 30 would necessitate the human reviewer visually comparing each and every extracted polygon with the corresponding portion of the reference IC layout, which is tedious at best, and not feasible in the case of a large IC with thousands, tens of thousands, or more features that would need to be visually compared.

In an optional operation 38, a report may be generated presenting the errors that were detected in the operation 30 and verified (i.e. accepted) by human review in the operation 38. Such a report may, for example, optionally include comparison images for each verified error of a type already described with reference to the UI provided in operation 36. Optionally, the report may also include the automatically detected errors that were not verified (i.e. were rejected) by the human review, preferably labeled as unverified or rejected errors (or similar nomenclature). If no verified errors are determined (e.g., if the human reviewer does not accept any of the automatically identified errors) then the operation 38 may optionally present a report indicating successful verification of the physical IC 10.

In an optional operation 40, various further processing may be performed, such as extracting the circuit based on the extracted polygons and the matched reference IC layout 12 (along with any verified errors), and/or performing behavior recovery and/or other analyses.

It should be noted that the automatically detected errors output by the operation 30, and the verified errors (if any) confirmed in the validation process 36, may not necessarily be "errors" in the sense of being inadvertent mistakes made during fabrication of the physical IC 10. For example, an automatically detected error may indeed be an inadvertent mistake made by the foundry; but it may instead reflect an intentional modification of the physical IC 10 compared with the design-basis reference IC layout 12, for example introduced by the foundry to insert malicious functionality, or introduced by the foundry in an effort to reduce IC manufacturing costs. Regardless of the source of the errors, such errors are to be detected when validating the physical IC 10.

It is also noted that each of the operations 36, 38, and 40 is in general optional, and one or more such operations may be omitted in some implementations. For example, if the layer images produced by the operations 14 and 16 are of sufficiently high quality, then there may be no need for the manual review in which case operation 36 may optionally be omitted. The generation of a report per operation 38 may be omitted depending on the task being performed. The operation 40 generally reflects optional further analyses and may be omitted entirely.

Figure 6:
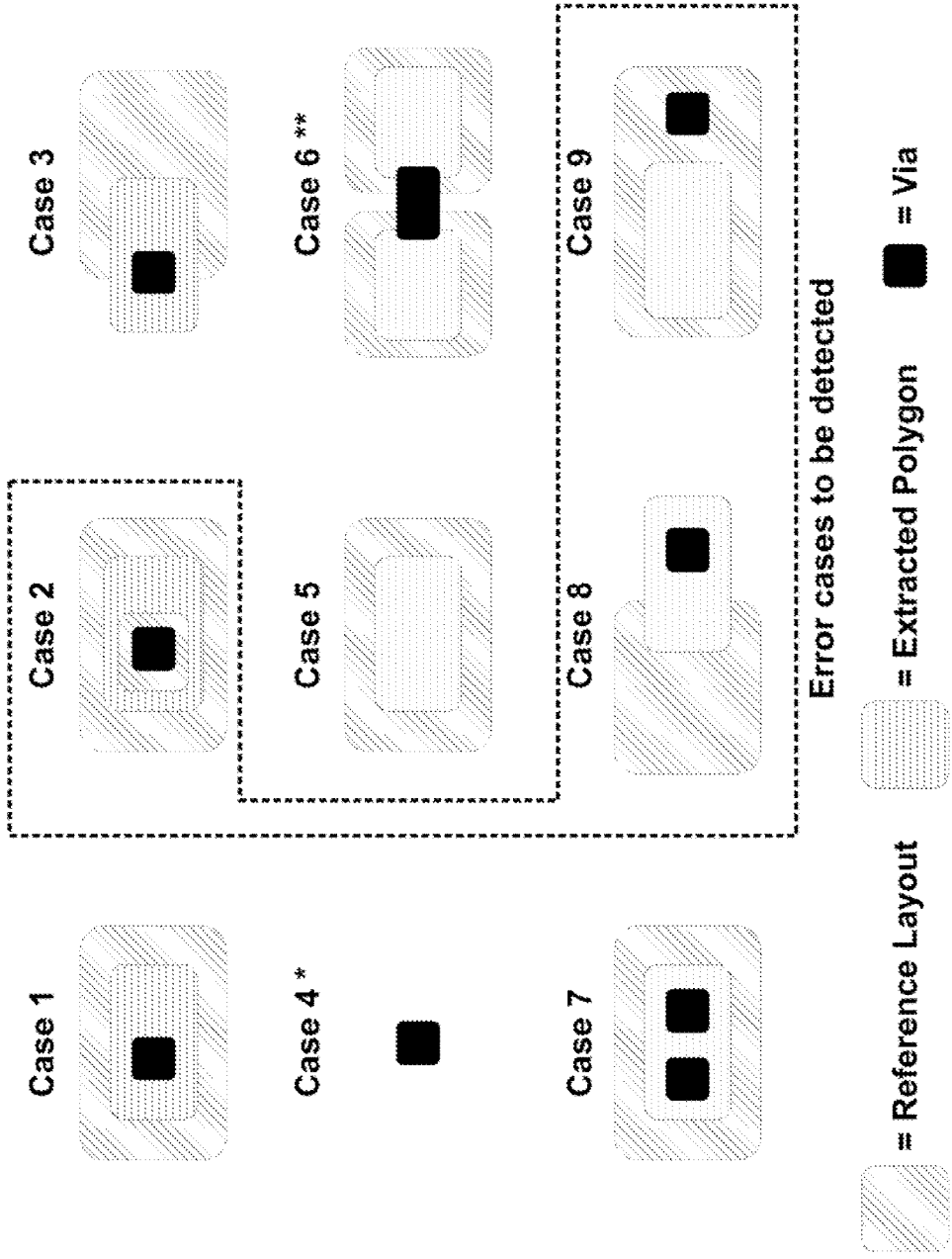
FIG. 6 diagrammatically illustrates nine possible cases for topological coverage suitably employed in the topological coverage analysis employed in the process of FIG. 1.

With reference now to FIGS. 4-6, further details and embodiments are described of the operation 30 in which errors in the physical IC 10 are detected by applying homeomorphic error detection to compare the extracted polygons with polygons of the reference IC layout 12. In general, the disclosed approaches employ homeomorphic error detection using topological equivalence and topological coverage. FIG. 4 presents a mathematical definition 50 of topological equivalence, and a mathematical definition 52 of topological coverage. In these definitions, G:={p} where p is a polygon and {p} is the set of polygons in the geometry (e.g., the set of extracted polygons, or the set of polygons making up the reference IC layout). As can be seen in the definition 50, topological equivalence quantifies whether polygons are overlapping.

FIG. 5 diagrammatically depicts six possible cases for topological equivalence. Of these, only cases 3, 4, 5, and 6 are error cases to be detected in operation 30. Summarizing these cases, an error comprising a topological inequivalence is detected in which:

Case 3: an extracted polygon bridges two polygons of the reference IC layout,

Case 4: two extracted polygons overlap a single polygon of the reference IC layout, Case 5: an extracted polygon does not overlap any polygon of the reference IC layout, or Case 6: a polygon of the reference IC layout does not overlap any extracted polygon.

In the example of analysis of a layer image depicting a metallization layer of the BEOL processing product, the polygons shown in FIG. 5 are polygons representing electrical traces of the metallization layer depicted in that layer image. It should be noted that a given polygon may have a much more complex shape than the simple rectangular polygons depicted in FIG. 5. For example, a polygon may have an angle, form a closed loop, or so forth. Furthermore, a polygon may have one or more curved edges, e.g. a circular polygon (which can always be represented by a mathematically precise polygon by using a sufficient number of polygon sides to approximate the curved edge of the circle or the like).

It will be appreciated that Case 5 of FIG. 5 is detected as an error because (in the case of a BEOL layer image) it represents an extracted polygon (i.e. electrical trace) that is present in the physical IC 10 that is not present in the reference IC layout 12. This can therefore be an electrical connection that should not be present accordingly to the reference IC layout 12, and such an extra electrical connection can modify the functionality of the physical IC 10 as compared with the reference IC layout 12.

Similarly, Case 6 of FIG. 5 is detected as an error because (in the case of a BEOL layer image) it represents a trace of the reference IC layout 12 that is not present in the physical IC 10. This can therefore be a missing electrical connection, that again can modify functionality of the physical IC 10 compared with the reference IC layout 12.

Case 3 of FIG. 5 represents the case in which two traces of the reference IC layout 12 have been merged into a single trace in the physical IC 10. Conversely, Case 4 of FIG. 5 represents a single trace of the reference IC layout 12 that has been broken into two traces in the physical IC 10. Again, either of these two cases can modify functionality of the physical IC 10 compared with the reference IC layout 12.

By contrast, the detecting of errors in operation 30 of FIG. 1 does not include detecting an error comprising a topological inequivalence in which a single extracted polygon misaligned with a single polygon of the reference IC layout (Case 1 of FIG. 5). In this Case 1, although the two polygons are not identical, the misalignment cannot modify functionality of the physical IC 10 compared with the reference IC layout 12, since it does not change electrical connections. As for Case 2, it will be appreciated that this combines Case 5 (unknown polygon) and Case 6 (missing polygon), and hence is detected by detecting Cases 5 and 6.

Turning now to the topological coverage according to definitions 52 of FIG. 4, here the detecting of errors includes detecting an error comprising a topological coverage error of an extracted polygon respective to an extracted polygon representing a conductive trace and a polygon of the reference IC layout representing a conductive trace. In BEOL processing product verification, topological coverage analysis facilitates detecting extra or missing vias. Hence, the topological coverage analysis considers subsets of three, or possibly four, polygons.

As seen in FIG. 6, there are nine possible cases to consider. Of these, only Case 2, Case 8, and Case 9 are detected as errors. Cases 8 and 9 reflect situations in which the via does not land on the correct electrical trace, either because it lands on an extracted polygon trace but misses the corresponding reference layout trace (Case 8), or because it lands on a reference layout trace but misses the corresponding extracted polygon trace (Case 9). Case 2 reflects a case in which the number of electrical traces contacted by a via is different in the physical IC 10 versus the reference IC layout 12.

Hence, in an embodiment, the detecting of errors includes detecting an error in which:

an extracted polygon representing a via overlaps an extracted polygon representing a conductive trace but does not overlap any polygon of the reference IC layout representing a conductive trace (Case 8);

an extracted polygon representing a via overlaps a polygon of the reference IC layout representing a conductive trace but does not overlap any extracted polygon representing a conductive trace (Case 9); or an extracted polygon representing a via overlaps a single extracted polygon representing a conductive trace and two polygons of the reference IC representing conductive traces (Case 2).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An integrated circuit (IC) analysis system comprising:
an electronic processor;

a display operatively connected with the electronic processor; and a non-transitory storage medium storing a reference IC layout and instructions readable and executable by the electronic processor to perform an IC analysis method comprising:

receiving layer images of a physical IC;

extracting polygons depicted in the layer images by one or more of pixel transforms, thresholding filters, smoothness filters, and morphological operations;

detecting errors in the physical IC by applying homeomorphic error detection to compare the extracted polygons with polygons of the reference IC layout, the homeomorphic error detection including at least one of a topological inequivalence analysis and a topological coverage analysis; and displaying the detected errors on the display.

2. The IC analysis system of claim 1 wherein the detecting of errors includes detecting an error comprising a topological inequivalence between an extracted polygon or set of polygons from the physical IC layout and a polygon or set of polygons from the reference IC layout.

3. The IC analysis system of claim 1 wherein the detecting of errors includes detecting an error comprising a topological inequivalence in which:

an extracted polygon bridges two or more polygons of the reference IC layout, two or more extracted polygons overlap a single polygon of the reference IC layout, an extracted polygon does not overlap any polygon of the reference IC layout, or a polygon of the reference IC layout does not overlap any extracted polygon.

4. The IC analysis system of claim 3 wherein the detecting of errors does not include detecting an error comprising a topological inequivalence in which a single extracted polygon misaligned with a single polygon of the reference IC layout.

5. The IC analysis system of claim 1 wherein the detecting of errors includes detecting an error comprising a topological coverage error of an extracted polygon respective to an extracted polygon representing a conductive trace and a polygon of the reference IC layout representing a conductive trace by detecting extra or missing vias in the extracted polygon.

6. The IC analysis system of claim 1 wherein the detecting of errors includes detecting an error in which:

an extracted polygon representing a via overlaps an extracted polygon representing a conductive trace but does not overlap any polygon of the reference IC layout representing a conductive trace;

an extracted polygon representing a via overlaps a polygon of the reference IC layout representing a conductive trace but does not overlap any extracted polygon representing a conductive trace; or an extracted polygon representing a via overlaps a single extracted polygon representing a conductive trace and two polygons of the reference IC representing conductive traces.

7. The IC analysis system of claim 1 wherein the reference IC layout comprises a GDSII layout.

8. The IC analysis system of claim 1 wherein the displaying of the detected errors on the display includes:

displaying a user interface (UI) by which a user can review the detected errors and accept or reject each detected error.

9. The IC analysis system of claim 1 further comprising:

a scanning electron microscope (SEM), wherein the electronic processor receives the layer images of the physical IC from the SEM.

10. A non-transitory storage medium storing:

a reference integrated circuit (IC) layout; and instructions readable and executable by a computer to perform an IC analysis method comprising:

receiving layer images of a physical IC;

extracting polygons depicted in the layer images by one or more of pixel transforms, thresholding filters, smoothness filters, and morphological operations;

detecting errors in the physical IC including detecting an error comprising a topological inequivalence between a polygon or set of polygons extracted from the layer images of the physical IC and a polygon or set of polygons from the reference IC layout, the homeomorphic error detection including at least one of a topological inequivalence analysis and a topological coverage analysis; and outputting the detected errors on a display of or operatively connected with the computer.

11. The non-transitory storage medium of claim 10 wherein the detecting of an error comprising a topological inequivalence includes detecting at least one of the following topological inequivalences:

an extracted polygon bridges two or more polygons of the reference IC layout, two or more extracted polygons overlap a single polygon of the reference IC layout, an extracted polygon does not overlap any polygon of the reference IC layout, or a polygon of the reference IC layout does not overlap any extracted polygon.

12. The non-transitory storage medium of claim 10 wherein the detecting of errors further includes:

detecting an error comprising a topological coverage error of an extracted polygon respective to an extracted polygon representing a conductive trace and a polygon of the reference IC layout representing a conductive trace by detecting extra or missing vias in the extracted polygon.

13. The non-transitory storage medium of claim 10 wherein the detecting of errors further includes detecting an error in which:

an extracted polygon representing a via overlaps an extracted polygon representing a conductive trace but does not overlay any polygon of the reference IC layout representing a conductive trace;

an extracted polygon representing a via overlaps a polygon of the reference IC layout representing a conductive trace but does not overlap any extracted polygon representing a conductive trace; or an extracted polygon representing a via overlaps a single extracted polygon representing a conductive trace and two or more polygons of the reference IC representing conductive traces.

14. The non-transitory storage medium of claim 10 wherein the reference IC layout comprises a GDSII layout.

15. The non-transitory storage medium of claim 10 wherein the displaying of the detected errors includes:

displaying a user interface (UI) which a user can review the detected errors and accept or reject each detected error.

16. A method of integrated circuit (IC) analysis comprising:
   receiving layer images of a physical IC at a computer;
   extracting polygons depicted in the layer images by one or more of pixel transforms, thresholding filters, smoothness filters, and morphological operations; and
   detecting errors in the physical IC by applying homeomorphic error detection to compare the extracted polygons with polygons of a reference IC layout, the homeomorphic error detection including at least one of a topological inequivalence analysis and a topological coverage analysis; and
   displaying the detected errors on a display of or operatively connected with the computer.

17. The method of claim 16 wherein the detecting of errors includes detecting an error comprising a topological inequivalence between an extracted polygon or set of polygons from the physical IC layout and a polygon or set of polygons from the reference IC layout.

18. The method of claim 16 wherein the detecting of errors includes detecting an error comprising a topological inequivalence in which:
   an extracted polygon bridges two or more polygons of the reference IC layout,
   two or more extracted polygons overlap a single polygon of the reference IC layout,
   an extracted polygon does not overlap any polygon of the reference IC layout, or
   a polygon of the reference IC layout does not overlap any extracted polygon.

19. The method of claim 16 wherein the detecting of errors includes detecting an error comprising a topological coverage error of an extracted polygon respective to an extracted polygon representing a conductive trace and a polygon of the reference IC layout representing a conductive trace by detecting extra or missing vias in the extracted polygon.

20. The method of claim 16 further comprising:
   acquiring the layer images of the physical IC using a scanning electron microscope (SEM); and
   wherein the receiving of the layer images at the computer comprises transferring the layer images acquired by the SEM to the computer.

* * * * *